United States Patent
Morikawa et al.

(10) Patent No.: US 8,420,255 B2
(45) Date of Patent: Apr. 16, 2013

(54) STORAGE CELL AND METHOD OF MANUFACTURING SAME

(75) Inventors: Koichi Morikawa, Kyoto (JP); Shinji Nakano, Osaka (JP); Nario Niibo, Osaka (JP); Yukio Nishioka, Hokkaido (JP); Masayuki Sato, Osaka (JP); Masashige Ashizaki, Osaka (JP)

(73) Assignee: Panasonic Corporation, Osaka (JP)

(*) Notice: Subject to any disclaimer, the term of this patent is extended or adjusted under 35 U.S.C. 154(b) by 1000 days.

(21) Appl. No.: 12/373,979

(22) PCT Filed: Aug. 3, 2007

(86) PCT No.: PCT/JP2007/065223
§ 371 (c)(1),
(2), (4) Date: Jan. 15, 2009

(87) PCT Pub. No.: WO2008/018369
PCT Pub. Date: Feb. 14, 2008

(65) Prior Publication Data
US 2009/0169989 A1    Jul. 2, 2009

(30) Foreign Application Priority Data

| Aug. 8, 2006 | (JP) | 2006-215307 |
| Aug. 8, 2006 | (JP) | 2006-215308 |
| Nov. 15, 2006 | (JP) | 2006-308771 |
| Nov. 15, 2006 | (JP) | 2006-308772 |
| Mar. 2, 2007 | (JP) | 2007-052464 |
| May 8, 2007 | (JP) | 2007-123194 |

(51) Int. Cl.
*H01M 2/30* (2006.01)
(52) U.S. Cl.
USPC ............................ 429/178; 429/185; 429/163
(58) Field of Classification Search .................. 429/178, 429/185, 163
See application file for complete search history.

(56) References Cited

U.S. PATENT DOCUMENTS 2,628,271 A * 2/1953 Brafman ................ 361/521
4,623,599 A   11/1986 Vourlis
(Continued)

FOREIGN PATENT DOCUMENTS

| JP | 61-264661 A | 11/1986 |
| JP | 62-005554 A | 1/1987 |

(Continued)

OTHER PUBLICATIONS

JP2001-126968 raw translation.*
(Continued)

*Primary Examiner* — Patrick Ryan
*Assistant Examiner* — Alex Usyatinsky
(74) *Attorney, Agent, or Firm* — Pearne & Gordon LLP

(57) ABSTRACT

A storage cell includes a storage element including first and second electrodes which are opposite to each other in a predetermined direction, a first terminal bonded to the first electrode, a second terminal bonded to the second electrode, and an outer resin covering the storage element to expose an outer surface of the first terminal and an outer surface of the second terminal from the outer resin. The storage element has substantially a rectangular shape viewing from the predetermined direction. The outer resin has substantially a rectangular shape viewing from the predetermined direction. The outer resin has first and second surfaces opposite to each other, and has a third surface connected with the first surface and the second surface. The first terminal is exposed on the first surface of the outer resin. The second terminal has a shape extending beyond the storage element along the first and third surfaces, and is exposed on the first surface. This storage cell has a small size, a large capacitance, and high reliability.

16 Claims, 10 Drawing Sheets

U.S. PATENT DOCUMENTS

| | | | |
|---|---|---|---|
| 5,398,155 A | 3/1995 | Sato et al. | |
| 6,657,850 B2 | 12/2003 | Nakazawa et al. | |
| 7,088,572 B2 * | 8/2006 | Yoshida et al. | 361/504 |
| 7,655,348 B2 * | 2/2010 | Nanno et al. | 429/90 |
| 2002/0191369 A1 | 12/2002 | Nakazawa et al. | |
| 2003/0081372 A1 | 5/2003 | Nakazawa et al. | |
| 2005/0231894 A1 * | 10/2005 | Yoshida et al. | 361/502 |
| 2009/0040690 A1 | 2/2009 | Yasuda | |
| 2009/0181297 A1 * | 7/2009 | Ashizaki et al. | 429/161 |

FOREIGN PATENT DOCUMENTS

| | | |
|---|---|---|
| JP | 64-6530 U | 1/1989 |
| JP | 5-28025 U | 4/1993 |
| JP | 06-077089 A | 3/1994 |
| JP | 09-283387 A | 10/1997 |
| JP | 2000-188244 A | 7/2000 |
| JP | 2001-126968 A | 5/2001 |
| JP | 2001-143958 A | 5/2001 |
| JP | 2002-170551 A | 6/2002 |
| JP | 2002-280264 A | 9/2002 |
| JP | 2003-133185 A | 5/2003 |
| JP | 2005-166974 A | 6/2005 |
| WO | 2006/004016 A1 | 1/2006 |

OTHER PUBLICATIONS

English translation of JP 05-028025 U previously submitted on Jan. 15, 2009.

South Korea Office Action dated Oct. 25, 2010.

Machine English translation of a previously cited reference JP05-028025U.

International Search Report for PCT/JP2007/065223.

* cited by examiner

STORAGE CELL AND METHOD OF MANUFACTURING SAME

TECHNICAL FIELD

The present invention relates to storage cells used in various electronic devices, and to a method of manufacturing the storage cell.

BACKGROUND ART

FIGS. 11A and 11B are a plan view and a side view of conventional surface-mounted type coin-shaped storage cell 501 disclosed in patent document 1. Storage cell 501 includes storage element 110, such as a secondary battery or a capacitor, negative terminal 111 connected with a negative electrode of storage element 110, and positive terminal 112 connected with a positive electrode of storage element 110. Terminals 111 and 112 have solder-plated layers 113 formed thereon. Terminals 111 and 112 have swaged portions 114 at their edges to be soldered easily.

Conventional storage cell 501 requires a large mounting area since negative terminal 111 and positive terminal 112 protrudes outward from storage element 110. Cell 501 can hardly have a small size and a large capacitance for use in a small product, such as a portable device.

Patent document 1: JP2002-170551A

SUMMARY OF THE INVENTION

A storage cell includes a storage element including first and second electrodes which are opposite to each other in a predetermined direction, a first terminal bonded to the first electrode, a second terminal bonded to the second electrode, and an outer resin covering the storage element to expose an outer surface of the first terminal and an outer surface of the second terminal from the outer resin. The storage element has substantially a rectangular shape viewing from the predetermined direction. The outer resin has substantially a rectangular shape viewing from the predetermined direction. The outer resin has first and second surfaces opposite to each other, and has a third surface connected with the first surface and the second surface. The first terminal is exposed on the first surface of the outer resin. The second terminal has a shape extending beyond the storage element along the first and third surfaces, and is exposed on the first surface.

This storage cell has a small size, a large capacitance, and high reliability.

REFERENCE NUMERALS

1 Storage Element
3 Separator
4 Case (First Case)
4A Engaged portion (First Engaged portion)
4B Open End (First Open End)
5 Case (Second Case)
5A Engaged portion (Second Engaged portion)
5B Open End (Second Open End)
6 Gasket
6A Holding Portion (First Holding Portion, Second Holding Portion)
6B Outer Wall
6C Inner Wall
6D Bridge Portion
6G Groove (First Groove)
6F Groove (Second Groove)
8 Outer Resin
8A Surface (First Surface)
8C Surface (Second Surface)
8D Surface (Third Surface)
38 Terminal (Second Terminal)
38A Stepped Portion (Second Stepped Portion)
38C Joined Portion (Second Joined Portion)
38D Connection Portion (Second Connection Portion)
39 Terminal (First Terminal)
39A Stepped Portion (First Stepped Portion)
39C Joined Portion (First Joined Portion)
39D Connection Portion (First Connection Portion)
41 Aperture
61 Aperture
204 Electrode (First Electrode)
205 Electrode (Second Electrode)
601 Electrolyte 602B Polarizable Electrode Layer (First Polarizable Electrode Layer)
602A Polarizable Electrode Layer (Second Polarizable Electrode Layer)
707A Terminal (Second Terminal)
707B Terminal (First Terminal)
1001 Storage Cell
1001A Predetermined Direction

DETAILED DESCRIPTION OF PREFERRED EMBODIMENTS

Exemplary Embodiment 1

Figure 1A:
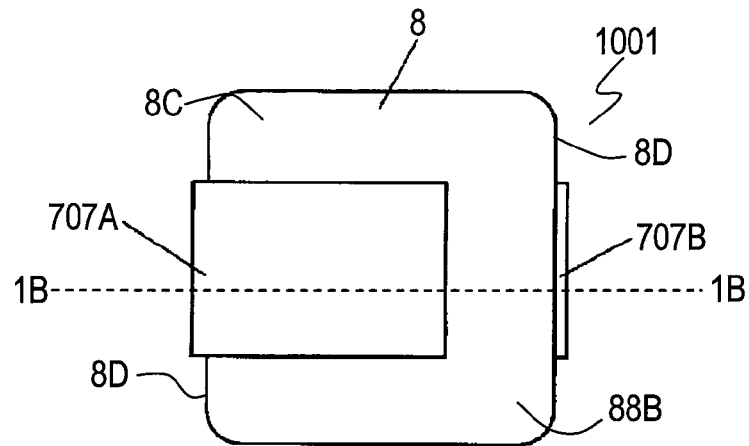
FIG. 1A is a plan view of a storage cell according to Exemplary Embodiment 1 of the present invention.
Figure 1B:
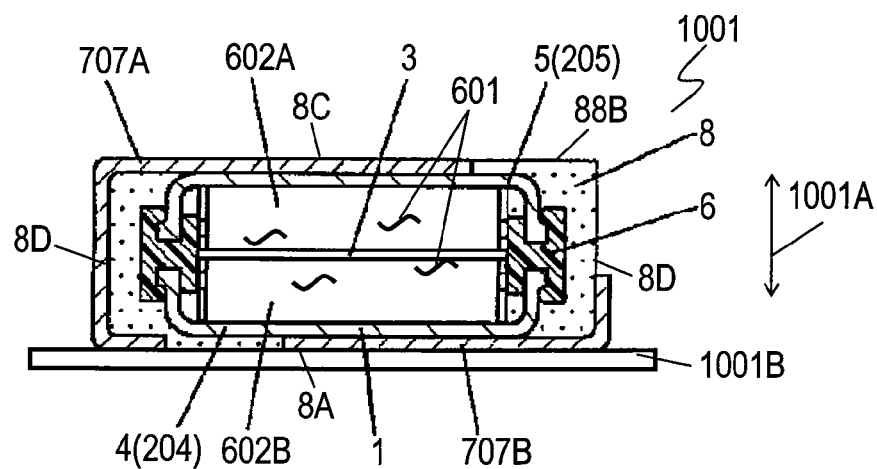
FIG. 1B is a sectional view of the storage cell at line 1B-1B shown in FIG. 1A.
Figure 1C:
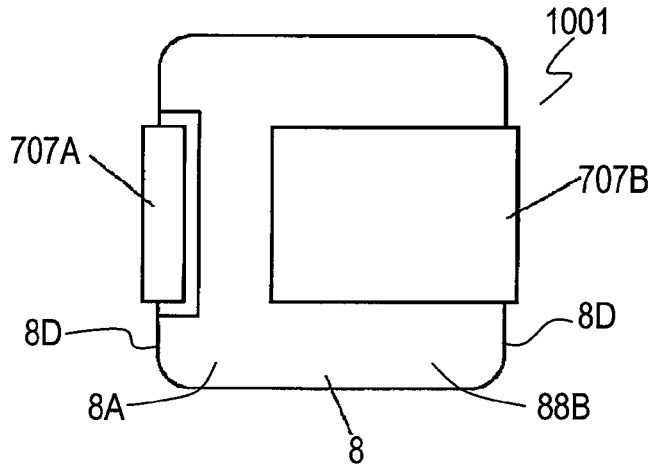
FIG. 1C is a bottom view of the storage cell according to Embodiment 1.

FIG. 1A is a plan view of storage cell 1001 according to Exemplary Embodiment 1 of the present invention. FIG. 1B is a sectional view of storage cell 1001 at line 1B-1B shown in FIG. 1A. FIG. 1C is a bottom view of storage cell 1001.

Storage element 1 according to Embodiment 1 is an electric double layer capacitor, and includes polarizable electrode layers 602A and 602B having opposite polarities, separator 3 provided between polarizable electrode layers 602A and 602B, electrolyte 601 impregnated in polarizable electrode layers 602A, 602B and separator 3, cases 4 and 5, and gasket 6 having an insulating property. Polarizable electrode layers 602A and 602B are arranged in predetermined direction 1001A, and have rectangular shapes viewing from predetermined direction 1001A. The rectangular shapes include rectangles and squares. Separator 3 has a rectangular shape viewing from predetermined direction 1001A, and has an insulating property. Polarizable electrode layers 602A and 602B face each other across separator 3 in predetermined direction 1001A. Cases 4 and 5 made of conductive material, such as metal, have rectangular shapes viewing from predetermined direction 1001A. Polarizable electrode layers 602A and 602B and separator 3 are accommodated between cases 4 and 5. Gasket 6 having an insulating property has a rectangular loop shape viewing from predetermined direction 1001A. Gasket 6 insulates between cases 4 and 5. Conductive cases 5 and 4 contact polarizable electrode layers 602A and 602B, and function as electrodes 205 and 204 of storage element 1, respectively. According to Embodiment 1, polarizable electrode layers 602A and 602B, i.e., electrodes 205 and 204, are a positive electrode and a negative electrode, respectively, however, may be reversed to be the negative electrode and the positive electrode respectively.

Terminals 707A and 707B are bonded to cases 5 and 4, respectively. Outer resin 8 having an insulating property covers storage element 1 such that outer surfaces of terminals 707A and 707B are exposed from the resin. Outer resin 8 has a substantially parallelepiped shape, and has a rectangular shape viewing from predetermined direction 1001A. Outer resin 8 has outer surface 88B. Outer surface 88B includes surface 8A, surface 8C opposite to surface 8A, and surface 8D connected with surfaces 8A and 8C. Terminals 707A and 707B are bent along outer surfaces 88B, i.e., surfaces 8A, 8C and 8D of outer resin 8, to have shapes along outer surfaces 88B of outer resin 8. Surface 8A covers case 4, and surface 8C covers case 5. Surfaces 8A and 8C are arranged in direction 1001A. Terminal 707B is exposed at surface 8A of outer resin 8. Terminal 707A extends to surface 8A beyond storage element 1 and is exposed at surface 8A of outer resin 8. Storage cell 1001 is mounted to mount material 1001B, such as a circuit board, while surface 8A is situated on mount material 1001B Polarizable electrode layers 602A and 602B contain activated carbon powder and conductive additive, such as carbon black. The activated carbon powder, the conductive additive, and water-soluble binder, such as polytetra-fluoroethylene or carboxymethyl cellulose, are mixed and kneaded with a kneading machine to prepare paste. This paste is molded to have predetermined size and shape, and dried, thereby providing polarizable electrode layers 602A and 602B.

Figure 2A:
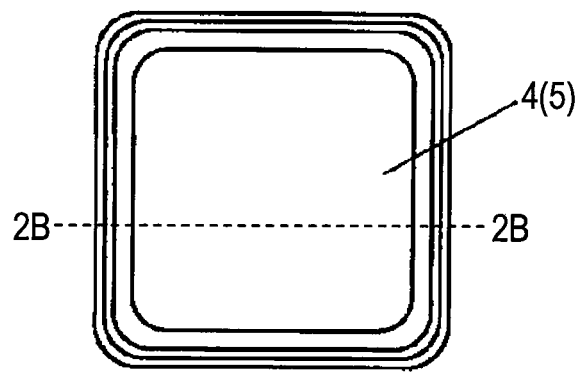
FIG. 2A is a plan view of a case of the storage cell according to Embodiment 1.
Figure 2B:
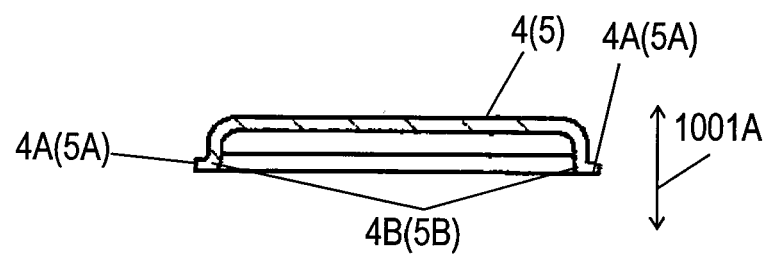
FIG. 2B is a sectional view of the case at line 2B-2B shown in FIG. 2A.
Figure 2C:
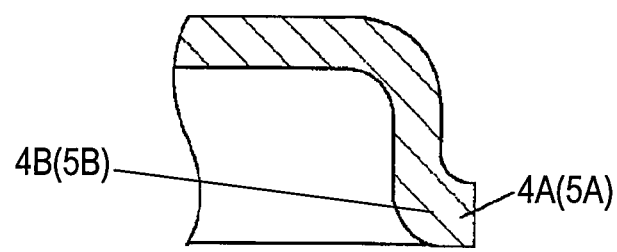
FIG. 2C is an enlarged sectional view of the case shown in FIG. 2B.

FIG. 2A is a plan view cases 4 and 5. FIG. 2B is a sectional view of cases 4 and 5 at line 2B-2B shown in FIG. 2A. FIG. 2C is an enlarged sectional view of cases 4 and 5 shown in FIG. 2B. Cases 4 and 5 are formed by shaping stainless steel plate into shapes and dimensions identical to each other. Both cases 4 and 5 have open ends 4B and 5B provided with engaged portions 4A and 5A having flange shapes provided at open ends 4B and 5B, respectively. Engaged portions 4A and 5A have rectangular loop shapes viewing from predetermined direction 1001A.

Figure 3A:
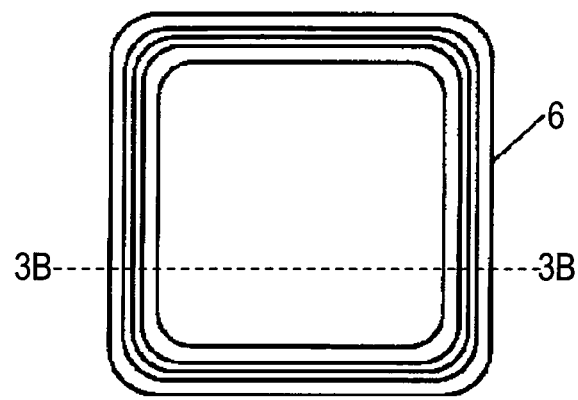
FIG. 3A is a plan view of a gasket of the storage cell according to Embodiment 1.
Figure 3B:
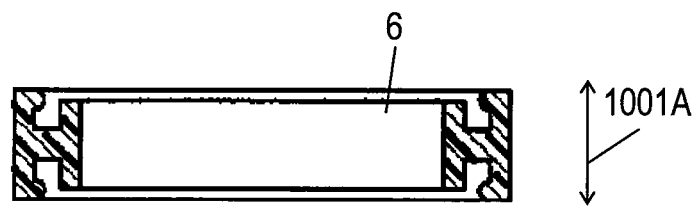
FIG. 3B is a sectional view of the gasket at line 3B-3B shown in FIG. 3A.
Figure 3C:
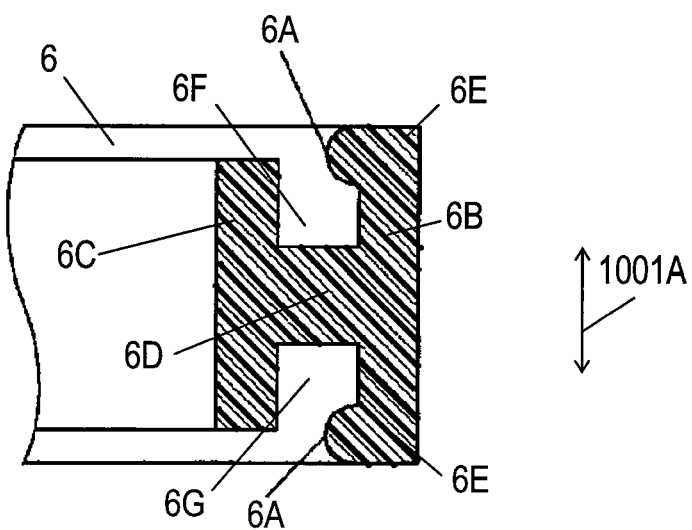
FIG. 3C is an enlarged sectional view of the gasket shown in FIG. 3B.

FIG. 3A is a plan view of gasket 6. FIG. 3B is a sectional view of gasket 6 at line 3B-3B shown in FIG. 3A. FIG. 3C is an enlarged sectional view of gasket 6 shown in FIG. 3B. Insulating gasket 6 having a rectangular loop shape is made of thermoplastic resin. Gasket 6 has a cross section having a substantially H-shape, and grooves 6F and 6G having rectangular loop shapes. This cross section of gasket 6 has inner wall 6C, outer wall 6B, and bridge portion 6D connecting inner wall 6C and outer wall 6B. Inner wall 6C is located inside of cases 4 and 5. Outer wall 6B is located outer than inner wall 6C is, and is located an outside of cases 4 and 5. Bridge portion 6D is located between open end 4B of case 4 and open end 5B of case 5. Gasket 6 has holding portions 6A protruding from edges 6E of outer wall 6B toward inner wall 6C. Open end 5B of case 5 is inserted in groove 6F so that engaged portion 5A of case 5 having the flange shape is retained securely with holding portion 6A of gasket 6. Similarly, open end 4B of case 4 is inserted in groove 6G of gasket 6 so that engaged portion 4A is retained securely with holding portion 6A of gasket 6.

Insulating gasket 6 made of thermoplastic resin may be made of polyphenylene sulfide resin (PPS) containing glass fiber, liquid crystalline polymer, polyether ether ketone (PEEK), or a butyl rubber. These are selected preferably according to the purpose. For example, upon requiring elasticity, gasket 6 may be made of butyl rubber. In order to be shaped easily, gasket 6 may be made of PPS containing glass fiber, liquid crystalline polymer, or PEEK resin. Upon requiring large heat resistance, gasket 6 may be made of PEEK resin. If gasket 6 is made of butyl rubber, the butyl rubber contains of non-halogen butyl rubber, vulcanizing agent, such as alkyl-phenol resin, and reinforcing agent containing carbon black and silica.

Outer resin 8 having an insulating property may be made of either thermoplastic resin or thermosetting resin. Gasket 6 may preferably have a heat resistant temperature higher than that of outer resin 8. This arrangement prevents gasket 6 sealing storage element 1 from receiving thermal damage, and ensures a heat resistant property when storage element 1 is covered with outer resin 8. According to Embodiment 1, outer resin 8 is made of epoxy resin, and gasket 6 is made of PPS resin containing 30% of glass fiber.

Outer resin 8 may preferably have hardness larger than that of gasket 6. The hardness of outer resin 8 suppresses a pressure rise due to gas produced in storage element 1 to prevent the gas from leaking outside.

According to Embodiment 1, storage element 1 of storage cell 1001 has the rectangular shape, and hence, reduces a loss in its mounting area. Terminals 707A and 707B have the shapes along outer resin 8 covering storage element 1, and allow storage cell 1001 to be mounted in a small area. Storage cell 1001 according to Embodiment 1 can be mounted in an area approximately 50% of an area where conventional storage cell 501 shown in FIG. 11 is mounted even when storage element 1 contained in storage cell 1001 has the same capacitance as storage element 110 of storage cell 501.

Figure 11A:
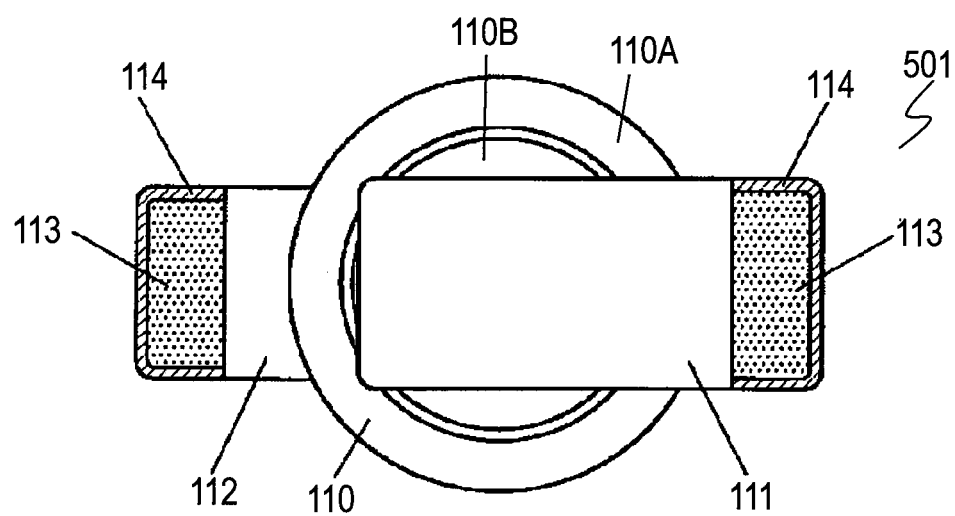
FIG. 11A is a plan view of a conventional storage cell.
Figure 11B:
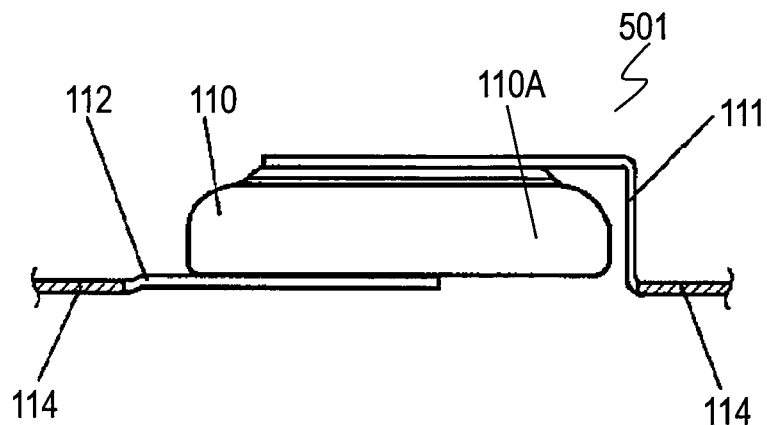
FIG. 11B is a side view of the conventional storage cell.

Conventional storage element 110 shown in FIG. 11 has case 110A and cover 110B for sealing case 110A. In the case that conventional storage element 110 has a rectangular shape, cover 11B can hardly be crimped and joined to case 110A particularly at corners evenly, hence creating variations of sealing tightness.

In storage cell 1001 according to Embodiment 1, cases 4 and 5 are coupled with gasket 6, and covered with outer resin 8, thereby ensuring tight sealing between cases 4 and 5 and providing the cell with high reliability. Storage cell 1001 solves the problem that the crimp joint used in the conventional storage cell 501 shown in FIG. 11 can hardly performed around the corners of the rectangular shape.

A method of manufacturing storage cell 1001 according to Embodiment 1 will be described below.

First, polarizable electrode layers 602A and 602B having a substantially parallelepiped shape are produced. Activated carbon powder, electro-conductive additive, such as carbon black, and water-soluble binder, such as polytetra-fluoroethylene or carboxymethyl cellulose, are mixed and knead with a kneading machine, providing paste. This paste is shaped to have a predetermined size and a predetermined shape, and dried to provide polarizable electrode layers 602A and 602B.

Then, polarizable electrode layers 602A and 602B are arranged to face each other across separator 3 having an insulating property, and then, insulating separator 3 and polarizable electrode layers 602A and 602B are impregnated with electrolyte 601.

Then, insulating separator 3 polarizable electrode layers 602A and 602B having electrolyte 601 impregnated therein are placed in case 4, and gasket 6 is attached to open end 4B of case 4. Open end 5B of case 5 is then coupled to gasket 6 to accommodate separator 3 and polarizable electrode layers 602A and 602B within a space between cases 4 and 5. Then, gasket 6 is heated to shrink and couples cases 4 and 5 to seal between cases 4 and 5.

Figure 4:
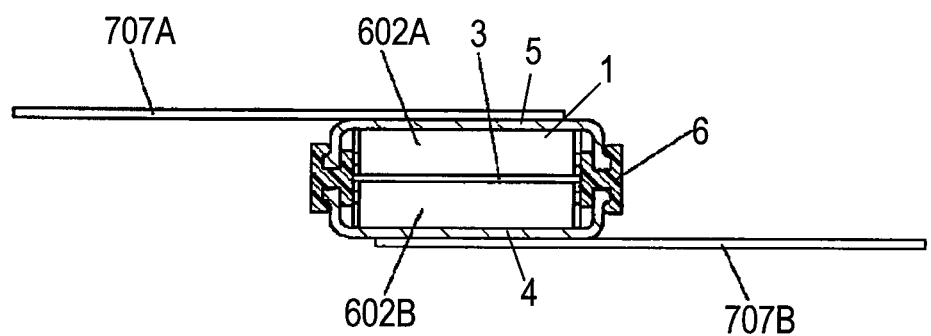
FIG. 4 is a sectional view of the storage cell having a terminal connected thereto according to Embodiment 1.

FIG. 4 is a sectional view of storage element 1 having terminals 707A and 707B joined thereto. As shown in FIG. 4, terminals 707A and 707B are bonded to cases 5 and 4, respectively, providing storage element 1.

Figure 5:
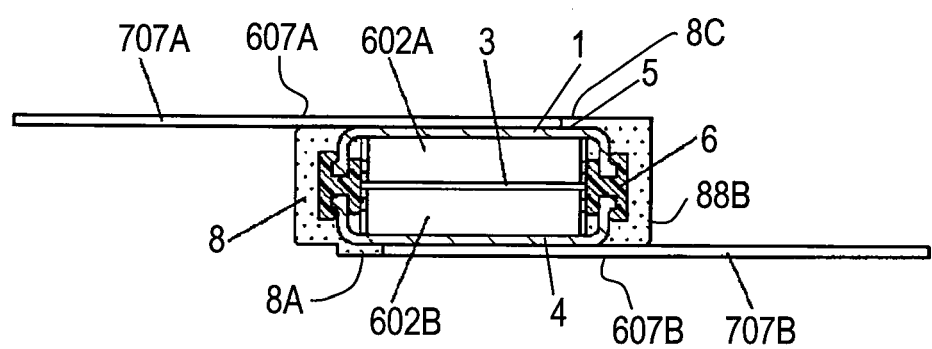
FIG. 5 is a sectional view of the storage cell covered with an outer resin according to Embodiment 1.

FIG. 5 is a sectional view of storage element 1 covered with outer resin 8. As shown in FIG. 5, storage element 1 is covered with outer resin 8 while exposing outer surfaces 607A and 607B of terminals 707A and 707B from outer resin 8.

Then, terminals 707A and 707B have unnecessary portions cut off and bent along outer surfaces 88B of outer resin 8 to have shapes along outer surfaces 88B of outer resin 8. Terminals 707A and 707B are positioned on surface 8A, thus providing storage cell 1001.

Exemplary Embodiment 2

Figure 6:
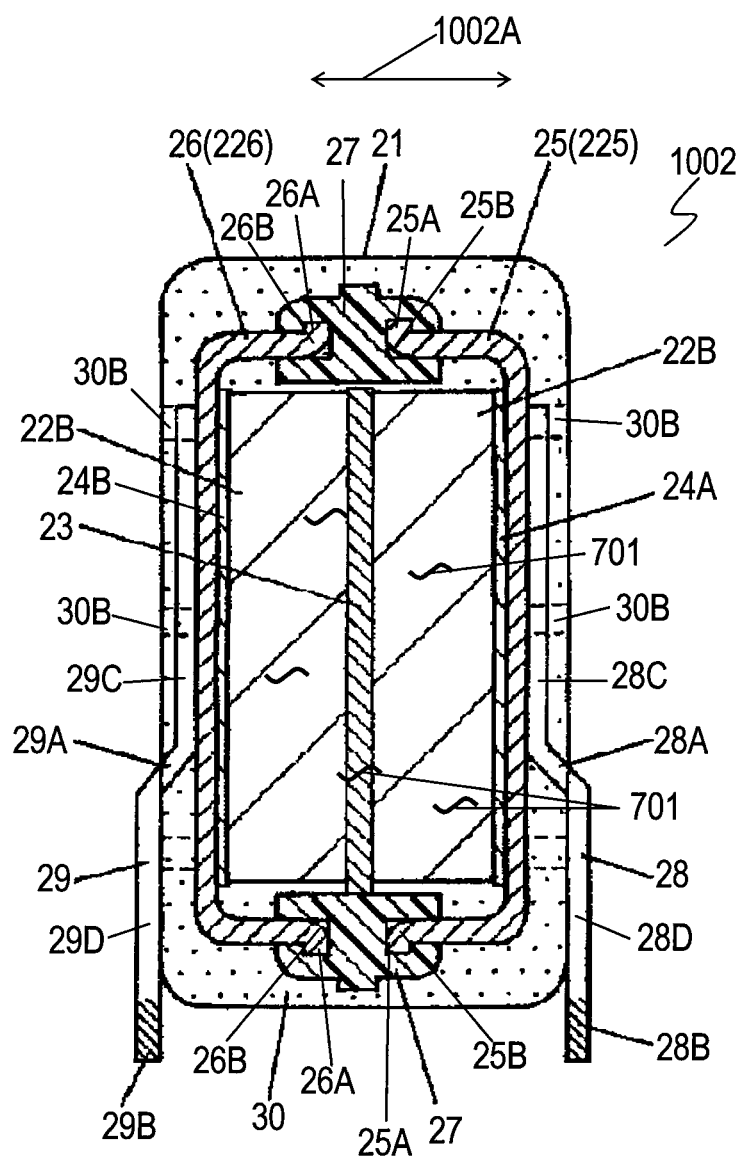
FIG. 6 is a sectional view of a storage cell according to Exemplary Embodiment 2 of the invention.

FIG. 6 is a sectional view of storage cell 1002 according to Exemplary Embodiment 2 of the present invention.

Storage element 21 is an electric double layer capacitor, and includes polarizable electrode layers 22A and 22B of opposite polarities, separator 23 provided between polarizable electrode layers 22A and 22B, cases 25 and 26 both made of metal, and gasket 27 having an insulating property. Polarizable electrode layers 22A and 22B are arranged in direction 1002A, and have rectangular shapes viewing from direction 1002A. The rectangular shapes include rectangles and squares. Separator 23 has a rectangular shape viewing from direction 1002A, and has an insulating property. Polarizable electrode layers 22A and 22B face each other across separator 23 in direction 1002A. Collectors 24A and 24B made of conductive material, such as carbon, are formed on polarizable electrode layers 22A and 22B, respectively. Polarizable electrode layers 22A and 22B, separator 23, and collectors 24A and 24B are impregnated with electrolyte 701. Polarizable electrode layers 22A and 22B, separator 23, and collectors 24A and 24B are placed in case 25, and gasket 27 is attached to open end 25B of case 25. Then, Open end 26B of case 26 is coupled to gasket 27 to sandwich gasket 27 between cases 26 and 25, thus accommodating polarizable electrode layers 22A and 22B, separator 23, and collectors 24A and 24B within a space of cases 25 and 26. Gasket 27 is then heated to thermally bond with cases 25 and 26 to seal them. Conductive cases 25 and 26 are connected with polarizable electrode layers 22A and 22B through collectors 24A and 24B, respectively, to function as electrodes 225 and 226 of storage element 21. According to Exemplary Embodiment 2, polarizable electrode layers 22A and 22B, i.e., electrodes 225 and 226 are function as positive and negative electrodes, respectively, however, may function negative and positive electrodes, respectively.

Figure 7A:
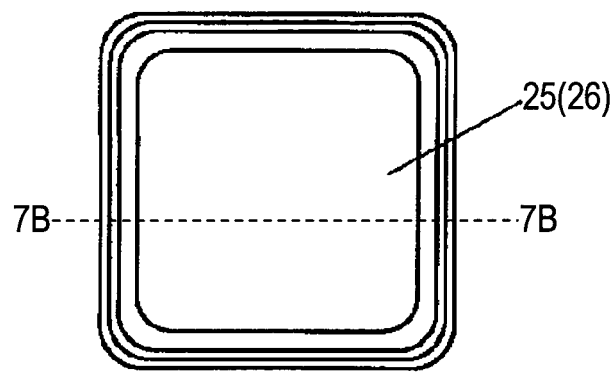
FIG. 7A is a plan view of a metal case of the storage cell according to Embodiment 2.
Figure 7B:
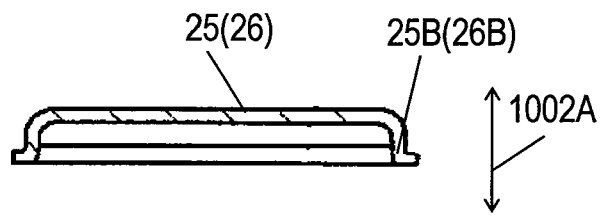
FIG. 7B is a sectional view of the metal case at line 7B-7B shown in FIG. 7A.
Figure 7C:
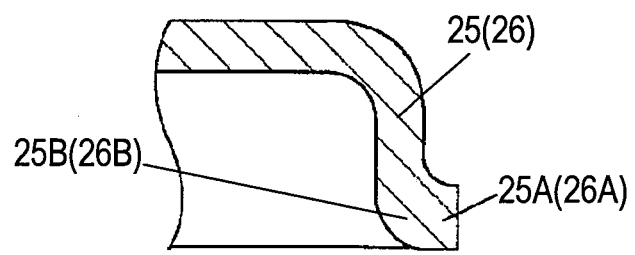
FIG. 7C is an enlarged sectional view of the metal case shown in FIG. 7B.

FIG. 7A is a plan view of each of cases 25 and 26. FIG. 7B is a sectional view of each of cases 25 and 26 at line 7B-7B shown in FIG. 7A. FIG. 7C is an enlarged sectional view of each of cases 25 and 26 shown in FIG. 7B. Cases 25 and 26 are formed by shaping steel sheet sheets to have the same shapes and dimensions. Cases 25 and 26 have open ends 25B and 26B, respectively. Engaged portions have flange shapes provided at open ends 25B and 26B, respectively. Engaged portions 25A and 26A have rectangular loop shape viewing from direction 1002A. Insulating gasket 27 is made of thermoplastic resin and has a rectangular loop shape. Gasket 27 has across section having an H-shape similarly to gasket 6 according to Embodiment 1 shown in FIGS. 3A to 3C. Open end 25B of case 25 is inserted and retained in groove 27F of gasket 27 having the cross section having the H-shape. Similarly, open end 26B of case 26 is inserted and retained in groove 27G of gasket 27. Gasket 27 is then heated to thermally bond with cases 25 and 26.

Insulating gasket 27 made of thermoplastic resin may be made of polyphenylene sulfide (PPS) resin containing glass fiber, liquid crystalline polymer, polyether ether ketone (PEEK), or butyl rubber. These materials are selected according to a purpose. For example, upon requiring elasticity, gasket 27 may be made of butyl rubber. In order to shape gasket 27 easily, gasket 27 may be made of PPS containing glass fiber, liquid crystalline polymer, or PEEK. Upon requiring high heat resistance, gasket 27 may be made of PEEK. In the case that gasket 27 is made of butyl rubber, the butyl rubber may contain non-halogen type butyl rubber, vulcanizing agent, such as alkyl-phenol resin, and reinforcing agent containing carbon black and silica.

Terminals 28 and 29 are bonded to cases 25 and 26, respectively. Terminal 28 has joined portion 28C bonded to case 25, stepped portion 28A extending from joined portion 28C in a direction away from case 25, i.e., storage element 21, connection portion 28D extending from stepped portion 28A in parallel with joined portion 28C, and plated portion 28B provided at an end of connection portion 28D. Terminal 29 has joined portion 29C bonded to case 26, stepped portion 29A extending from joined portion 29C in a direction away from case 26, i.e., storage element 21, connection portion 29D extending from stepped portion 29A in parallel with joined portion 29C, and plated portion 29B provided at an end of connection portion 29D. Plated portions 28B and 29B are made by tin plating.

Insulating outer resin 30 covers storage element 21 and terminals 28 and 29 to expose connection portions 28C and 29D and plated portions 28B and 29D from resin 30, providing storage cell 1002 which can be surface-mounted.

Polarizable electrode layers 22A and 22B contain activated carbon powder and conductive additive, such as carbon black. The activated carbon powder, the conductive additive, and water-soluble binder, such as polytetra-fluoroethylene or carboxymethyl cellulose, are mixed and kneaded with a kneading machine. This paste is shaped to have predetermined size and shape, and dried to provide polarizable electrode layers 22A and 22B.

FIG. 7A is a plan view of each of cases 25 and 26. FIG. 7B is a sectional view of each of cases 25 and 26 at line 7B-7B shown in FIG. 7A. FIG. 7C is an enlarged sectional view of each of cases 25 and 26 shown in FIG. 7B. Cases 25 and 26 are formed by shaping stainless steel sheets to have the same shapes and dimensions. Cases 25 and 26 have open ends 25B and 26B, respectively. Engaged portions 25A and 26A having flange shapes are provided at open ends 25B and 26B of cases 25 and 26, respectively. Engaged portions 25A and 26A have rectangular loop shape viewing from direction 1002A.

Insulating outer resin 30 may be made of thermosetting resin, such as epoxy resin. A method of covering storage element 21 with outer resin 30 will be described. Storage element 21 having terminals 28 and 29 bonded to cases 25 and 26 is placed in an injection molding die. At this moment, slide pins press and hold cases 25 and 26 and terminals 28 and 29. The thermosetting resin is injected into the molding die and cured to form outer resin 30. Then, the slide pins are pulled out from outer resin 30, providing storage cell 1002. Outer resin 30 has holes 30B formed by inserting the slide pins. Portions of cases 25 and 26 and terminals 28 and 29 are exposed through holes 30B.

Terminals 28 and 29 are made of either aluminum or stainless steel. The surfaces of terminals 28 and 29 are roughened to have a surface roughness (Ra) more than 0.05 µm to be adhered to outer resin 30. Connection portions 28D and 29D of terminals 28 and 29 are connected with an outside when storage cell 1002 is mounted to a circuit board. Plated portions 28B and 29B may be soldered easily when connection portions 28D and 29D are connected with the circuit board.

In storage cell 1002 according to Embodiment 2, storage element 21 has the rectangular shape, and hence, reduces a loss in its mounting area. In storage cell 1002, cases 25 and 26 are coupled with gasket 27, and covered with outer resin 30, thereby ensuring tight sealing between cases 25 and 26 and providing the cell with high reliability. Storage cell 1002 solves the problem that the crimp joint used in the conventional storage cell 501 shown in FIG. 11 can hardly performed around the corners of the rectangular shape.

Storage element 21 is covered with outer resin 30 to expose connection portions 28D and 29D of terminals 28 and 29. This structure prevents outer resin 30 from being cracked in areas of outer resin 30 around terminals 28 and 29, thus providing reliable seal between cases 25 and 26.

Terminals 28 and 29 may be joined to cases 25 and 26 by welding. In this case, welding spots protruding from terminals 28 and 29 may be produced. Outer resin 30 covers the welding spots so as to prevent the spots from protruding from outer resin 30. This therefore prevents the storage cell from short-circuiting after the storage cell is mounted to the circuit board.

Exemplary Embodiment 3

Figure 8A:
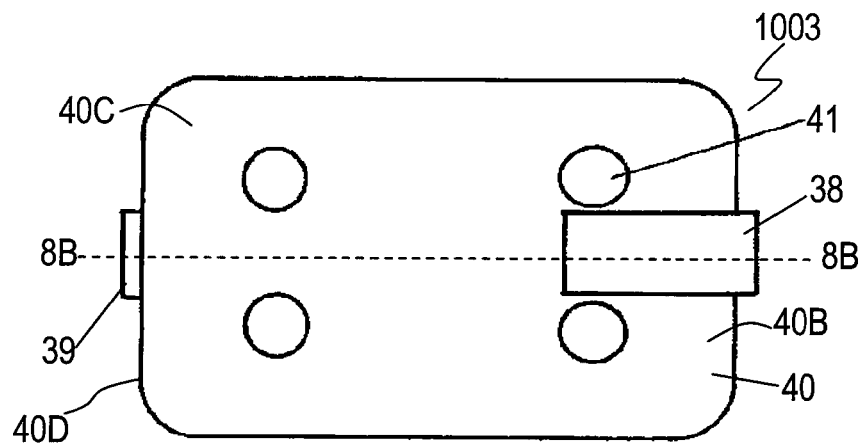
FIG. 8A is a plan view of a storage cell according to Exemplary Embodiment 3 of the invention.
Figure 8B:
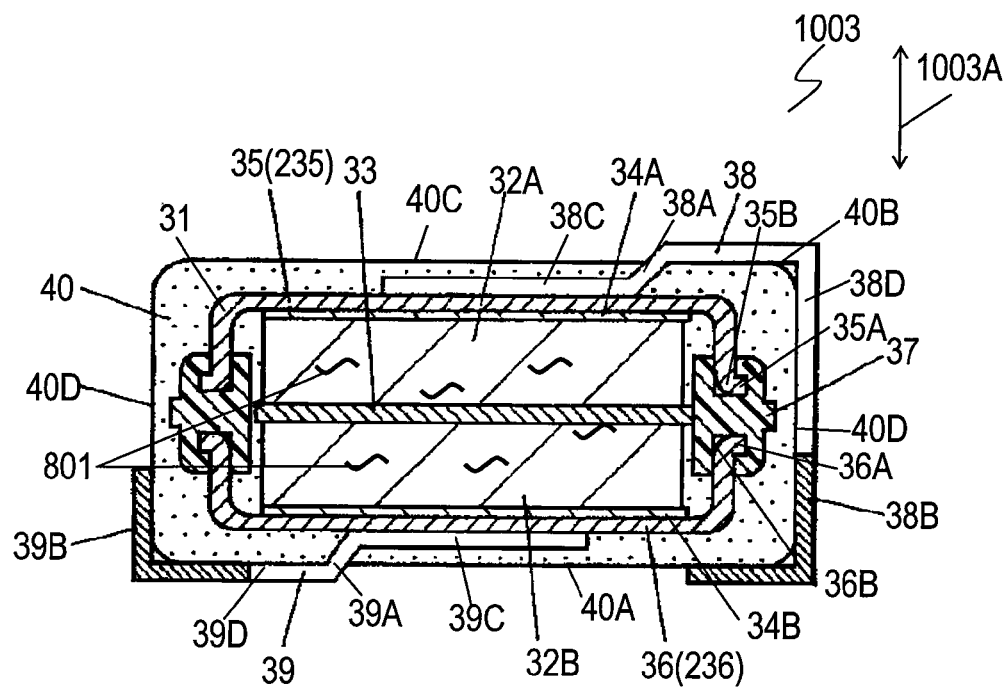
FIG. 8B is a sectional view of the storage cell at line 8B-8B shown in FIG. 8A.

FIG. 8A is a plan view of storage cell 1003 according to Exemplary Embodiment 3 of the present invention. FIG. 8B is a sectional view of storage cell 1003 at line 8B-8B shown in FIG. 8A.

Storage element 31 is an electric double layer capacitor, and includes polarizable electrode layers 32A and 32B having opposite polarities, separator 33 provided between polarizable electrode layers 32A and 32B, cases 35 and 36 made of metal, and insulation gasket 37. Polarizable electrode layers 32A and 32B are arranged in direction 1003A, and have rectangular shapes viewing from direction 1003A. The rectangular shapes include rectangles and squares. Separator 33 has a rectangular shape viewing from direction 1003A, and has an insulating property. Polarizable electrode layers 32A and 32B face each other across separator 33 in direction 1003A. Collectors 34A and 34B made of conductive material, such as carbon, are formed on polarizable electrode layers 32A and 32B, respectively. Polarizable electrode layers 32A and 32B, separator 33, and collectors 34A and 34B are impregnated with electrolyte 801. Polarizable electrode layers 32A and 32B, separator 33, and collectors 34A and 34B are accommodated in case 35. Then, gasket 37 is attached to open end 35B of case 35. Then, open end 36B of case 36 is placed on gasket 37. Gasket 37 is sandwiched between cases 36 and 35, and cases 35 and 36 accommodate polarizable electrode layers 32A and 32B, separator 33, and collectors 34A and 34B within a space between cases 35 and 36. Gasket 37 is then heated to be thermally bond with cases 35 and 36 to seal cases 35 and 36. Both of conductive cases 35 and 36 are connected with polarizable electrode layers 32A and 32B via collectors 34A and 34B, respectively, thus functioning as electrodes 235 and 236 of storage element 31. According to Embodiment 3, polarizable electrode layers 32A and 32B, i.e., electrodes 235 and 236 are assigned to positive and negative electrodes, respectively, however, may be assigned to the negative and positive electrodes, respectively.

Terminals 38 and 39 are bonded to cases 35 and 36, respectively. Terminal 38 has joined portion 38C bonded to case 35, stepped portion 38A extending from joined portion 38C in a direction away from case 35, i.e., storage element 31, connection portion 38D extending from stepped portion 38A, and plated portion 38B provided at an end of connection portion 38D. Terminal 39 has joined portion 39C bonded to case 36, stepped portion 39A extending from joined portion 39C in a direction away from case 36, i.e., storage element 31, connection portion 39D extending from stepped portion 39A, and plated portion 39B provided at an end of connection portion 39D. Plated portions 38B and 39B are formed by tin plating.

Insulating outer resin 40 covers storage element 31 and terminals 38 and 39 to expose connection portions 38D and 39D and plated portion 38B and 39B from outer resin 40.

Terminals 38 and 39 are made of either aluminum or stainless steel. Surfaces of terminals 38 and 39 are roughened to having a surface roughness (Ra) greater than 0.05 µm to adhere to outer resin 40 securely. Connection portions 38D and 39D of terminals 38 and 39 are connected with an outside circuit when storage cell 1003 is mounted to a substrate. Plated portions 38B and 39B allows connection portions 38D and 39D to be soldered easily to connection portions 38D and 39D on a circuit board.

Outer resin 40 has a substantially parallelepiped shape, and has a rectangular shape viewing from direction 1003A. Outer resin 40 has outer surfaces 40B including surface 40A, surface 40C opposite to surface 40A, and surface 40D connected with surfaces 40A and 40C. Connection portions 38D and 39D of terminals 38 and 39 are bent along outer surfaces 40B, i.e., surfaces 40A and 40D of outer resin 40 to have shapes along outer surfaces 40B of outer resin 40. Surface 40A covers case 36. Surface 40C covers case 35. Surfaces 40A and 40C are arranged in direction 1003A. Connection portion 39D is exposed on surface 40A of outer resin 40. Stepped portion 38A of terminal 38 protrudes from surface 40C of outer resin 40. Connection portion 38D (plated portion 38B) extends beyond storage element 31 to surface 40A of outer resin 40 and is exposed on surface 40A. Surface 40A is placed on a mounting board, such as a wiring board to mount storage cell 1003 on the mounting board.

Figure 9A:
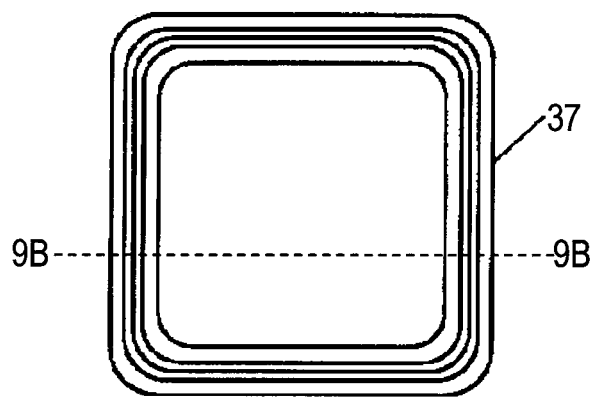
FIG. 9A is a plan view of a gasket of the storage cell according to Embodiment 3.
Figure 9B:
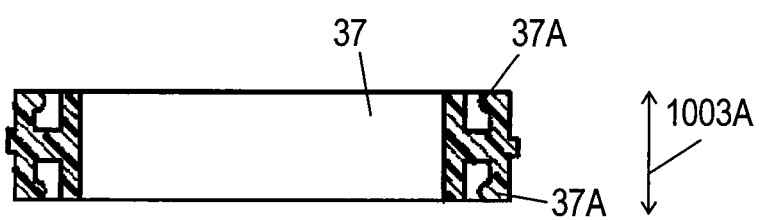
FIG. 9B is a sectional view of the gasket at line 9B-9B shown in FIG. 9A.
Figure 9C:
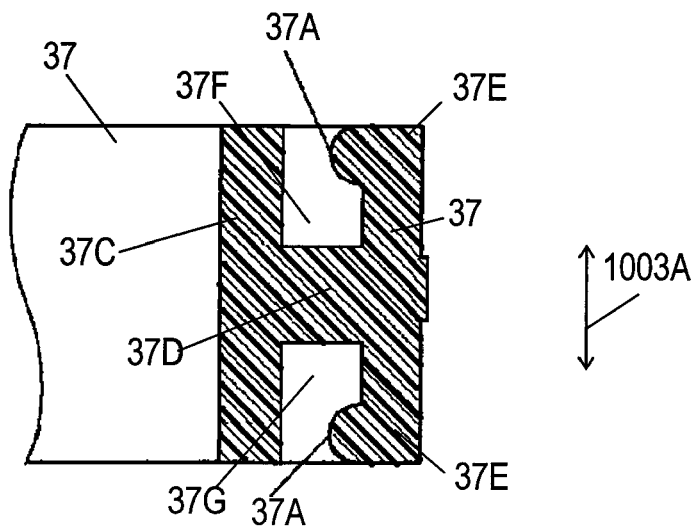
FIG. 9C is an enlarged sectional view of the gasket shown in FIG. 9B.

FIG. 9A is a plan view of gasket 37. FIG. 9B is a sectional view of gasket 37 at line 9B-9B shown in FIG. 9A. FIG. 9C is an enlarged sectional view of gasket 37 shown in FIG. 9B.

Insulation gasket 37 having a rectangular loop shape is made of thermoplastic resin. Gasket 37 has a cross section having a substantially H-shape having grooves 37F and 37G having loop shapes. This cross section of gasket 37 has inner wall 37C, outer wall 37B, and bridge portion 37D connecting inner wall 37C and outer wall 37B. Inner wall 37C is located inside cases 35 and 36. Outer wall 37B located outer than inner wall 37C is located outside cases 35 and 36. Bridge portion 37D is located between open end 35B of case 35 and open end 36B of case 36. Gasket 37 has holding portions 37A protruding from edges 37E of outer wall 37B toward inner wall 37C. Open end 35B of case 35 is inserted in groove 37F so that engaged portion 35A of case 35 having a flange shape is retained securely by holding portion 37A provided at gasket 37. Similarly, open end 36B of case 36 is inserted in groove 37G of gasket 37 so that engaged portion 36A is retained securely by holding portion 37A provided at gasket 37.

Insulating outer resin 40 may be made of thermosetting resin, such as epoxy resin. A method of covering storage element 31 with outer resin 40 will be described below. Storage element 31 having terminals 38 and 39 bonded to cases 35 and 36, respectively is placed inside an injection molding die. At this moment, slide pins press and hold cases 35 and 36 and terminals 38 and 39. The thermosetting resin is injected into the molding die and cured to form outer resin 40. Then, the slide pins are taken out from outer resin 40 to provide storage cell 1003. Outer resin 40 has plural apertures 41 formed by the inserted slide pins, as shown in FIG. 8A. Portions of cases 35 and 36 and terminals 38 and 39 are exposed from apertures 41.

According to Embodiment 3, storage element 31 of storage cell 1003 has the rectangular shape, and hence, reduces a loss in its mounting area. Terminals 38 and 39 have the shapes along outer resin 40 covering storage element 31, and allow storage cell 1003 to be mounted in a small area. Storage cell 1003 according to Embodiment 3 can be mounted in an area approximately 50% of an area where conventional storage cell 501 shown in FIG. 11 is mounted even when storage element 31 contained in storage cell 1003 has the same capacitance as storage element 110 of storage cell 501.

In storage cell 1003 according to Embodiment 3, cases 35 and 36 are coupled with gasket 37, and covered with outer resin 40, thereby ensuring tight sealing between cases 35 and 36 and providing the cell with high reliability. Storage cell 1003 solves the problem that the crimp joint used in the conventional storage cell 501 shown in FIG. 11 can hardly performed around the corners of the rectangular shape.

Exemplary Embodiment 4

Figure 10A:
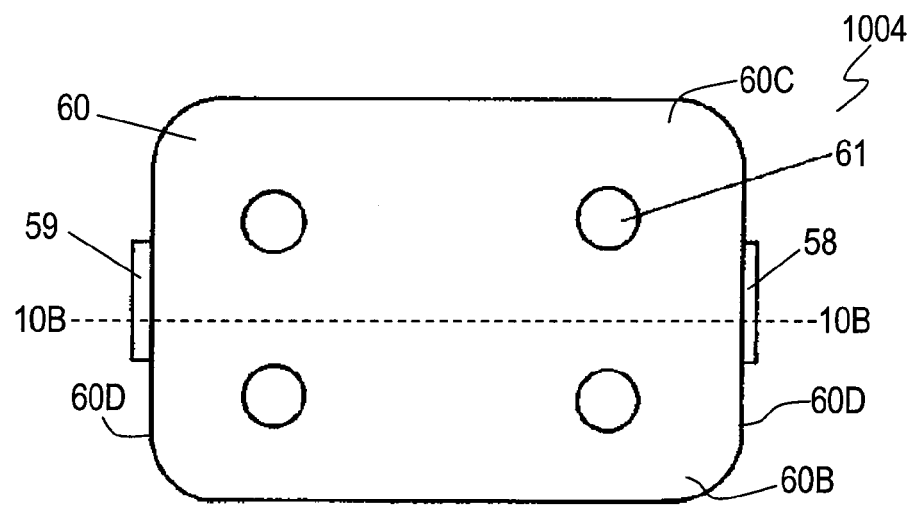
FIG. 10A is a plan view of a storage cell according to Exemplary Embodiment 4 of the invention.
Figure 10B:
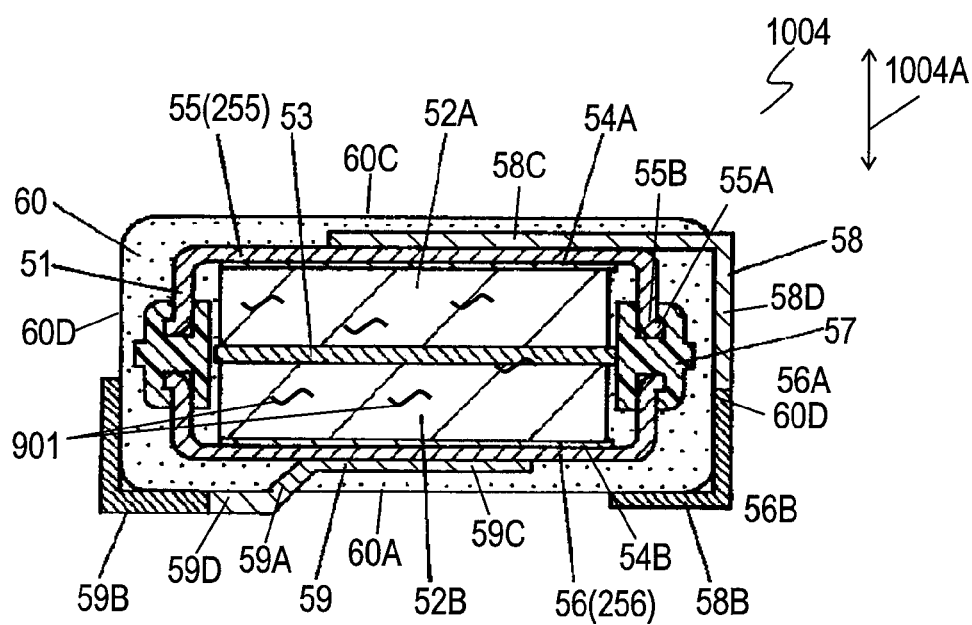
FIG. 10B is a sectional view of the storage cell at line 10B-10B shown in FIG. 10A.

FIG. 10A is a plan view of storage cell 1004 according to Exemplary Embodiment 4 of this invention. FIG. 10B is a sectional view of storage cell 1004 at line 10B-10B shown in FIG. 10A.

Storage element 51 is an electric double layer capacitor, and includes polarizable electrode layers 52A and 52B having opposite polarities, separator 53 provided between polarizable electrode layers 52A and 52B, cases 55 and 56 made of metal, and gasket 57 having an insulating property. Polarizable electrode layers 52A and 52B are arranged in direction 1004A, and have rectangular shapes viewing from direction 1004A. The rectangular shapes include rectangles and squares. Separator 53 has a rectangular shape viewing from direction 1004A, and has an insulating property. Polarizable electrode layers 52A and 52B face each other across separator 53 in direction 1004A. Collectors 54A and 54B made of conductive material, such as carbon, are formed on polarizable electrode layers 52A and 52B, respectively. Polarizable electrode layers 52A and 52B, separator 53, and collectors 54A and 54B are impregnated with electrolyte 901. Polarizable electrode layers 52A and 52B, separator 53, and collectors 54A and 54B are placed in case 55. Gasket 57 is attached to open end 55B of case 55. Then, open end 56B of case 56 is placed and coupled onto gasket 57 to sandwich gasket 57 between cases 56 and 55, thus accommodating polarizable electrode layers 52A and 52B, separator 53, and collectors 54A and 54B in cases 55 and 56. Gasket 57 is then heated to thermally bond with cases 55 and 56 to seal the cases. Conductive cases 55 and 56 are connected with polarizable electrode layers 52A and 52B via collectors 54A and 54B, respectively, and function as electrodes 255 and 256 of storage element 51. According to Exemplary Embodiment 4, polarizable electrode layers 52A and 52B, i.e., electrodes 255 and 256 are assigned to positive and negative electrodes, respectively, however, may be assigned to the negative and positive electrodes, respectively.

Terminals 58 and 59 are bonded to cases 55 and 56, respectively. Terminal 58 includes joined portion 58C bonded to case 55, connection portion 58D extending from joined portion 58C, and plated portion 58B provided at an end of connection portion 58D. Terminal 59 includes joined portion 59C bonded to case 56, stepped portion 59A extending from joined portion 59C in a direction away from case 56, i.e., storage element 51, connection portion 59D extending from stepped portion 59A, and plated portion 59B provided at an end of connection portion 59D. Plated portions 58B and 59B are formed by tin plating.

Insulating outer resin 60 covers storage element 51 and terminals 58 and 59 to expose connection portions 58D and 59D and plated portion 58B and 59D from the outer resin.

Terminals 58 and 59 are made of either aluminum or stainless steel. Surfaces of terminals 58 and 59 are roughening to have a surface roughness (Ra) greater than 0.05 μm to adhere securely to outer resin 60. Connection portions 58D and 59D of terminals 58 and 59 are connected with an outside circuit when storage cell 1004 is mounted to a mounting board. Plated portions 58B and 59B allows connection portions 58D and 59D to be soldered easily to be connected with the mounting board.

Outer resin 60 has a substantially parallelepiped shape, and has a rectangular shape viewing in direction 1004A. Outer resin 60 has outer surfaces 60B including surface 60A, surface 60C opposite to surface 60A, and surface 60D connected with surfaces 60A and 60C. Connection portions 58D and 59D of terminals 58 and 59 are bent along outer surfaces 60B, i.e., surfaces 60C and 60D of outer resin 60, to have shapes along outer surfaces 60B of outer resin 60. Surface 60A covers case 56. Surface 60C covers case 55. Surfaces 60A and 60C are arranged in direction 1004A. Connection portion 59D is exposed on surface 60A of outer resin 60. Joined portion 58C of terminal 58 protrudes from surface 60D of outer resin 60. Connection portion 58D (plated portion 58B) extends beyond storage element 51 to surface 60A of outer resin 60, and is exposed. In other words, terminal 58 does not protrude from outer surface 60C, and is entirely covered under surface 60C. Storage cell 1004 is mounted onto the mounting board, such as a wiring board while surface 60A is situated on the mounting board.

Insulating outer resin 60 may be made of thermosetting resin, such as epoxy resin. A method of covering storage element 51 with outer resin 60 will be described below. Storage element 51 having terminals 58 and 59 bonded to cases 55 and 56, respectively, is placed inside an injection molding die. At this moment, plural slide pins press and hold cases 55 and 56 and terminals 58 and 59. The thermosetting resin is injected into the molding die and cured to form outer resin 60. Than, the slide pins are taken out from outer resin 60 to provide storage cell 1004. Outer resin 60 has plural apertures 61 formed by the inserted slide pins, as shown in FIG. 10A. Portions of cases 55 and 56 and terminals 58 and 59 are exposed through apertures 61.

In storage cell 1004 according to Exemplary Embodiment 4, terminal 58 placed on surface 60B of outer resin 60B along case 55. This structure causes outer resin 60 to compress cases 55 and 56 against each other, and further ensures tightness of seal between cases 55 and 56, accordingly decreasing impedance.

Storage cells 1001 to 1004 according to Embodiments 1 to 4 include respective storage elements 1, 21, 31 and 51. However, any of them can be constructed so as to have a plural number of stacked storage elements. Storage elements 1, 21, 31 and 51 are electric double layer capacitors, however, may be other types of storage elements, such as secondary batteries or electrochemical capacitors, providing the same effects.

INDUSTRIAL APPLICABILITY

A storage cell according to the present invention has a small size, a large capacitance, and high reliability, hence being useful for a small device, such as s portable device that requires a small size and high-density mounting.

The invention claimed is:

1. A storage cell comprising:
a storage element having a cross section having substantially a rectangular shape, the storage element including a first electrode and a second electrode which are opposite to each other in a direction perpendicular to the cross section of the storage element;
a first terminal bonded to the first electrode;
a second terminal bonded to the second electrode; and
an outer resin having a cross section having substantially a rectangular shape, the outer resin covering the storage element to expose an outer surface of the first terminal and an outer surface of the second terminal from the outer resin, wherein
the outer resin has a first surface, a second surface, and a third surface, the first surface and the second surface being opposite to each other in a direction perpendicular to the cross section of the outer resin, the third surface connected with between the first surface and the second surface,
the first terminal is exposed on the first surface of the outer resin,
the second terminal has a shape extending along the first surface and the third surface, and is exposed on the first surface of the outer resin, and the storage element includes:
a first case having a cross section having substantially a rectangular shape, the first case having a first open end, the first case being conductive and functioning as the first electrode,
an insulation gasket having a cross section having substantially a rectangular loop shape, the gasket being provided at the first open end of the first case, and
a second case having a cross section having substantially a rectangular shape, the second case having a second open end facing the first open end of the first case across the gasket, the second case being conductive and functioning as the second electrode,
the first terminal includes:
a first joined portion bonded to the first electrode of the storage element;
a first stepped portion extending from the first joined portion in a direction away from the storage element to an outside of the outer resin; and
a first connection portion extending from the first stepped portion along the first surface of the outer resin,
the second terminal includes:
a second joined portion bonded to the second electrode of the storage element;
a second stepped portion extending from the second joined portion in a direction away from the storage element to an outside of the outer resin; and
a second connection portion extending from the second stepped portion,
the second connection portion of the second terminal extends from the second stepped portion along the exterior of second surface, the third surface, and the first surface of the outer resin.

2. The storage cell according to claim 1, wherein the storage element further includes
a first polarizable electrode layer connected with the first case;
a second polarizable electrode layer connected with the second case;
a separator provided between the first polarizable electrode layer and the second polarizable electrode layer, the separator having an insulating property; and
an electrolyte impregnated in the first polarizable electrode layer, the second polarizable electrode layer, and the separator.

3. The storage cell according to claim 1, wherein the gasket has a heat resistant temperature higher than a heat resistant temperature of the outer resin.

4. The storage cell according to claim 1, wherein the outer resin has hardness higher than hardness of the gasket.

5. The storage cell according to claim 1, wherein the gasket comprises thermoplastic resin.

6. The storage cell according to claim 1, wherein the gasket comprises butyl rubber.

7. The storage cell according to claim 1, wherein
the gasket has a cross section having substantially an H-shape having a first groove and a second groove,
the first open end of the first case is inserted in the first groove of the gasket, and
the second open end of the second case is inserted in the second groove of the gasket.

8. The storage cell according to claim 7, wherein
the gasket includes
an inner wall located inside the first case and the second case, an outer wall located outside the first case and the second case, a bridge portion connecting the inner wall and the outer wall, the bridge portion being located between the first open end of the first case and the second open end of the second case, and a first holding portion and a second holding portion protruding from both edges of the outer wall toward the inner wall, the first case further has a first engaged portion provided at the first open end, the first engaged portion having a flange shape, the second case further has a second engaged portion provided at the second open end, the second engaged portion having a flange shape, the first engaged portion of the first case is retained with the first holding portion of the gasket, and the second engaged portion of the second case is retained with the second holding portion of the gasket.

9. The storage cell according to claim 1, wherein the outer resin has a plurality of apertures provided therein, the first case, the second case, the first terminal, and the second terminal are exposed through the plurality of apertures.

10. The storage cell according to claim 1, wherein the outer resin has substantially a parallelepiped shape.

11. The storage cell according to claim 1, wherein the storage element has substantially a parallelepiped shape.

12. The storage cell according to claim 1, wherein the outer resin comprises thermoplastic resin.

13. The storage cell according to claim 1, wherein the outer resin comprises thermosetting resin.

14. The storage cell according to claim 1, wherein the second terminal has a shape extending beyond the storage element along the first surface and the third surface, and is exposed on the first surface of the outer resin.

15. The storage cell according to claim 1, wherein the first terminal and the second terminal extend in a same direction along a perimeter of the outer resin.

16. The storage cell according to claim 1, wherein the direction perpendicular to the cross section of the storage element is the same as the direction perpendicular to the cross section of the outer resin are identical directions, and wherein directions of the cross sections of the storage element, outer resin, first case, insulation gasket, and second case are the same.

* * * * *

UNITED STATES PATENT AND TRADEMARK OFFICE
CERTIFICATE OF CORRECTION

PATENT NO. : 8,420,255 B2  Page 1 of 1
APPLICATION NO. : 12/373979
DATED : April 16, 2013
INVENTOR(S) : Morikawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this
First Day of September, 2015

Michelle K. Lee
*Director of the United States Patent and Trademark Office*